Patented Oct. 4, 1938

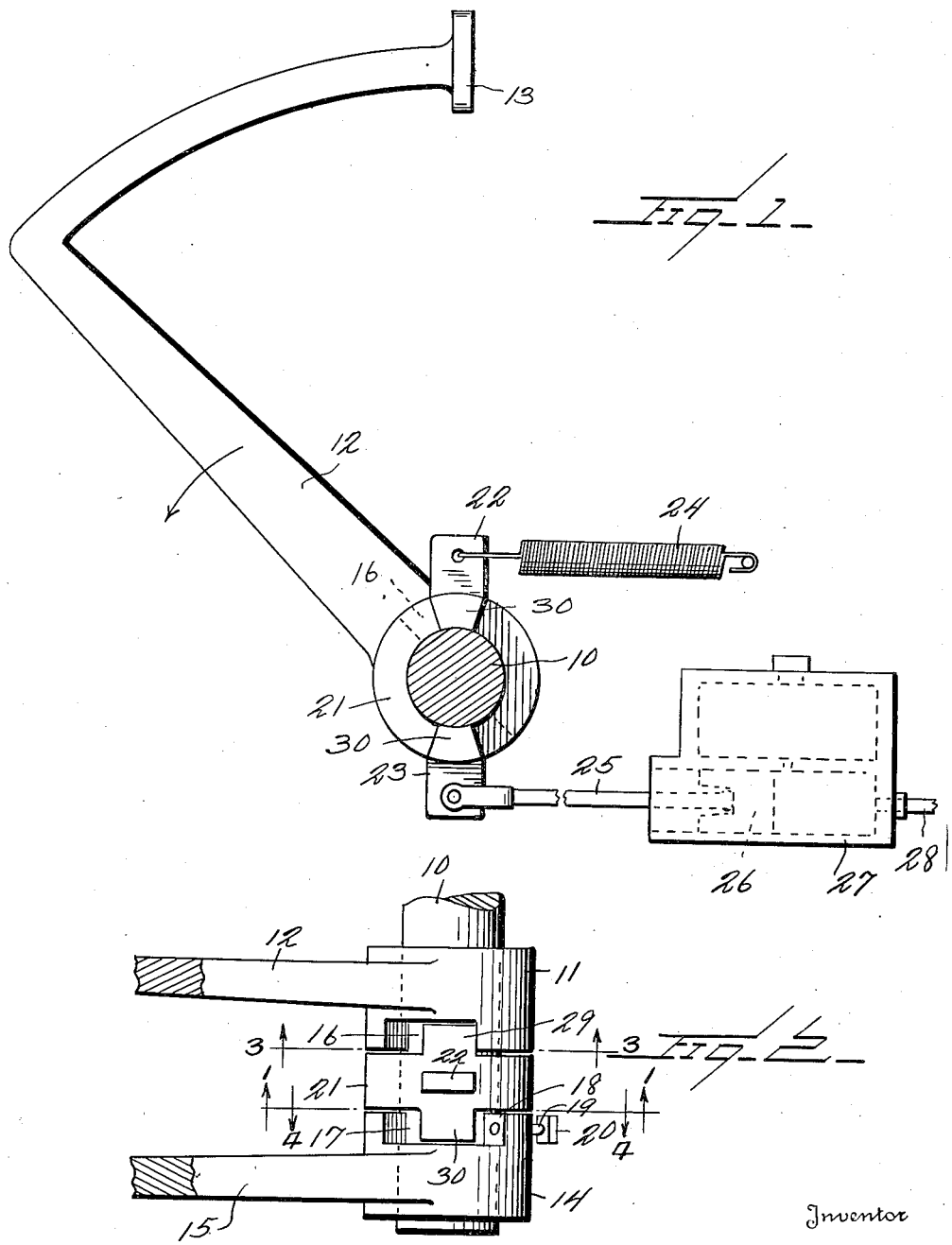

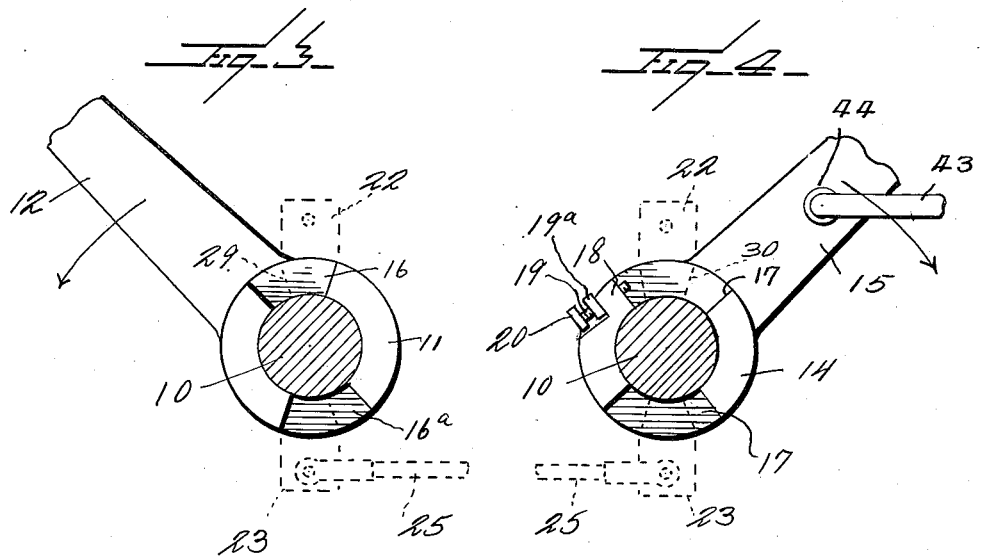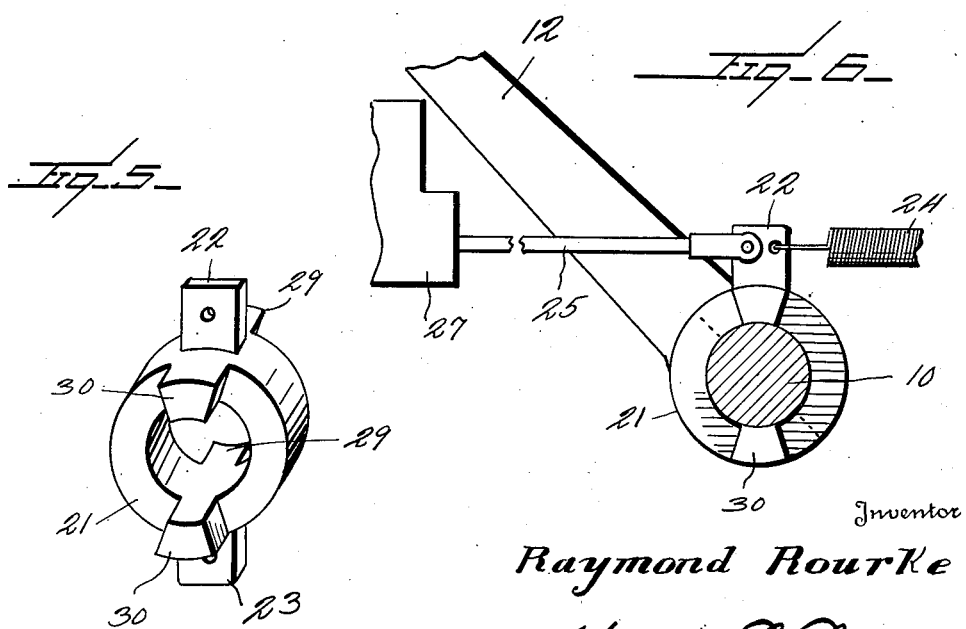

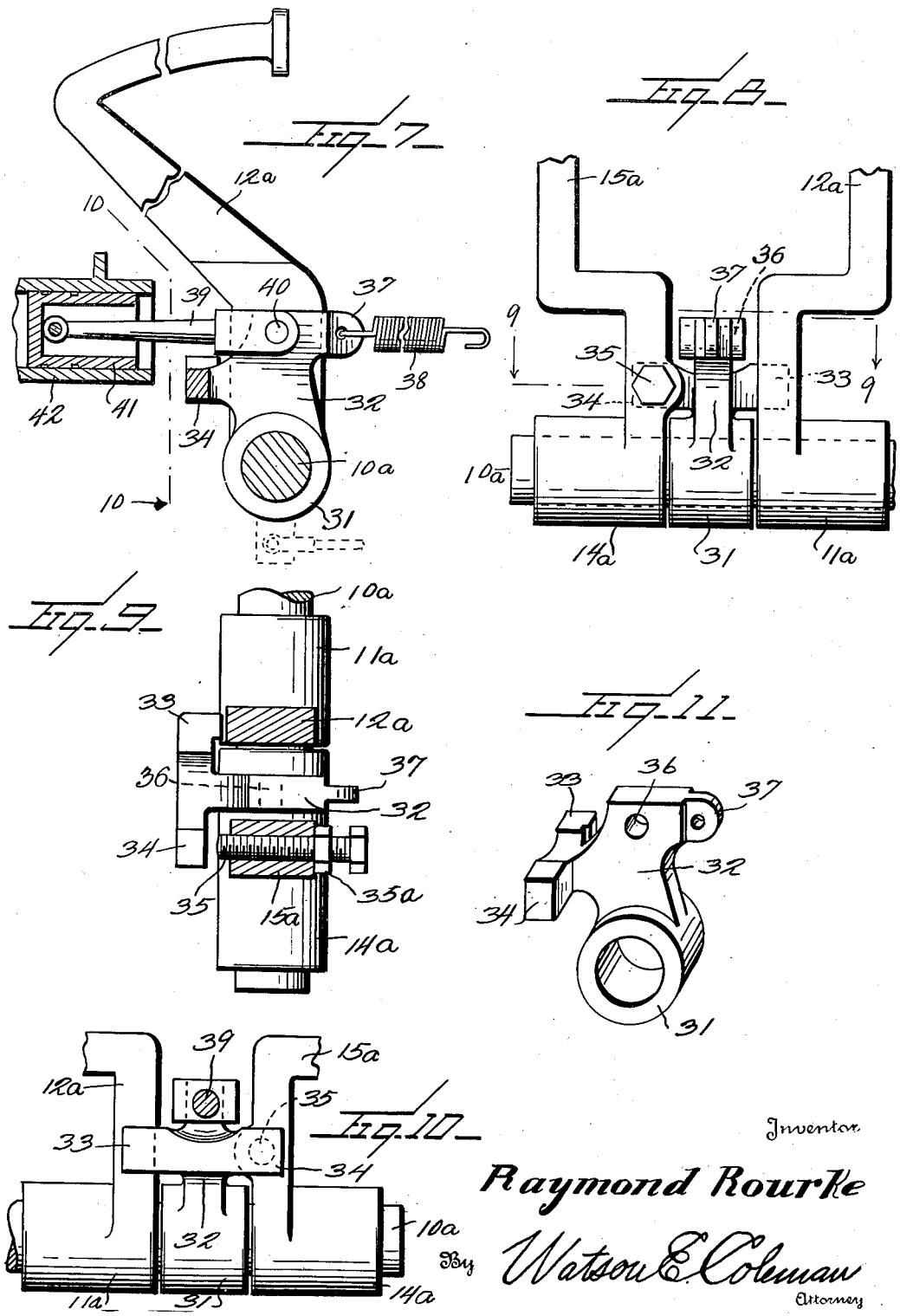

2,132,006

UNITED STATES PATENT OFFICE 2,132,006

BRAKE APPLYING MECHANISM FOR MOTOR VEHICLES

Raymond Rourke, Portageville, N. Y.

Application March 13, 1937, Serial No. 130,784

10 Claims. (Cl. 192—13)

This invention relates to the brake and clutch actuating mechanism of automobiles or automotive vehicles.

In all makes of automotive vehicles on the market as known to me, the brakes are controlled by a brake pedal or by an emergency brake, while the clutch is controlled by a separate pedal.

If the engine should stall, as for instance, on going up a hill, it is necessary to immediately apply the brakes and it is also necessary, in order to start the engine, that the clutch be thrown out and that the starter pedal be operated. This requires that one foot should be on the starter pedal or later on the accelerator pedal and the other foot on the clutch pedal, leaving no means for operating the brake pedal, hence the driver must hold the car by the emergency brake and use his feet for declutching and starting or accelerating. This is sometimes inconvenient, particularly for women drivers, as the application of the emergency brake requires the body to be flexed into an unusual and cramped position and also requires the exertion of considerable strength particularly if the grade be steep.

It is further the case that in hydraulic brake systems, there is a master cylinder and in all makes of brakes known to me, the piston operating in such a cylinder is loosely connected to a piston rod connected to and operated by a brake pedal. The loose coupling between the piston and the piston rod permits the piston to be delayed in its return until the wheel brakes relax and force or permit the piston to return to its initial position.

With these difficulties in mind, it is, therefore, one of the principal objects of this invention to avoid the difficulties of applying the emergency or service brake in order to hold a car from moving and provide an efficient brake which may be operated by the left foot of the driver and thus free the right foot from the necessity of operating the usual service brake to control the motor and another principal object of my invention is to provide a construction permitting either a brake pedal or a clutch pedal to be independently operated to apply the brakes, without transmitting motion to the other pedal.

Another object is the provision of a very simple mechanism whereby and upon the full depression of the clutch pedal just before the pedal reaches the floor board, the brakes will be automatically applied, this mechanism, however, in no way interfering with the partial or full application of the brakes when the clutch is in clutched position.

A further object is to provide a brake applying mechanism which will permit the connecting rod of the master cylinder to have a positive connection with its piston and yet permit the piston of the master cylinder to have a delayed return.

My invention is illustrated in the accompanying drawings wherein:

Figure 1 is a section through the clutch operating shaft and showing in elevation the brake operating element and the brake pedal.

Figure 2 is a top plan view of the structure shown in Figure 1, but showing the brake pedal and the clutch pedal both.

Figure 3 is a sectional view through the clutch shaft showing in elevation the brake pedal collar with its recesses.

Figure 4 is a section through the clutch shaft looking away from the brake pedal collar.

Figure 5 is a perspective view of the intermediate brake actuating element.

Figure 6 is a section of the clutch shaft and an elevation of the brake operating intermediate element and of the brake pedal showing a modified arrangement from that shown in Figure 1.

Figure 7 is a side elevation partly in section of another embodiment of my invention, the clutch pedal not being shown.

Figure 8 is a rear elevation of the structure shown in Figure 7, but showing the clutch pedal in elevation.

Figure 9 is a section on the line 9—9 of Figure 8.

Figure 10 is a front elevation of the structure shown in Figures 7 and 8.

Figure 11 is a perspective view of the intermediate element which is connected to the piston of the master cylinder.

Referring to Figures 1 to 5, 10 designates a shaft and loosely mounted thereon is the collar 11 of a brake pedal arm 12, the pedal of which is designated 13. Mounted on the shaft 10 is the collar 14 of a clutch pedal 15 which may be operatively connected to the clutch in any suitable manner. Thus, for instance, and preferably, the clutch pedal is operatively connected to the clutch by a rod or link 43 having an angular extremity engaging through an opening 44 in the arm of the clutch pedal 15. These collars 11 and 14 of the two pedals are spaced from each other a predetermined distance. That face of the collar 11 confronting the clutch pedal collar 14 is formed with two arcuate recesses 16 and 16ª. The face of the collar 14, which confronts the collar 11, is also formed with arcuate recesses 17 and 17a. One wall 18 of the recess 17 has a screw-threaded bore and extending through this bore is the screw-threaded pin 19 having a head 20 whereby the pin may be adjusted and a lock nut 19a. This pin constitutes an adjustable stop, as will be later described.

Disposed between the collar 11 and the collar 14 and loose upon the shaft 10 is an intermediate brake actuating element in the form of a collar 21, which loosely surrounds the shaft 10. This collar has an upwardly extending lug 22 and a downwardly extending lug 23. The lug 22 is connected to a retractile spring 24. The lug 23 is pivotally connected to a rod 25 which is positively connected to and operates the piston 26 of a hydraulic master cylinder, shown diagrammatically in Figure 1 and designated generally 27. This has a pipe 28 leading to the brakes and as the piston 26 is forced inward, it causes the application of the brakes, and when the brakes are relieved, it moves outward. While I have shown a positive connection between the rod 25 and the piston 26, it is to be understood that there may be a lost motion connection between this piston rod and the piston 26. Inasmuch as the loose connection between the piston rod and the piston is common and well known and has nothing particularly to do with my invention, it is not believed necessary to illustrate this feature. The spring 24 acts, of course, to retract the piston. The particular form of this master cylinder 27 has nothing to do with the present invention. The intermediate element 21 is formed on that face which confronts the collar 11 with two lugs 29, shown in dotted lines in Figure 3, which engage in the circumferentially extending recesses 16 and 16a previously referred to, these lugs 29 being disposed at diametrically opposite points on the collar 21, as shown in Figure 5. The opposite face of the collar 21, that is, the face confronting the clutch collar 14, is likewise provided with two laterally projecting lugs 30, as shown in Figure 5, which engage within the circumferentially extending recesses 17 and 17a formed in the collar 14.

It will be seen from Figure 2 that the recesses 16, 16a, 17, 17a are longer circumferentially than the lugs 29 and 30. Normally, and when the brake is off, and the parts are in the position shown in Figures 1 and 2, the upper lug 29 lies against the rear wall of the upper recess 16 and the lower lug 29 bears against the forward wall of the lower recess 16a. The upper lug 30 confronts the adjustable stop screw 19 while the lower lug 30 confronts the forward wall of the lower recess 17a as shown in Figure 4. It will be seen particularly from Figure 2 that there is considerable slack or lost motion of the lugs 29 and 30 within the recesses 16 and 17.

Under these circumstances and with the parts in the position shown in Figures 1 and 2, the brake pedal arm 12 may be depressed and the rear and forward ends of the recesses 16 and 16a, respectively, will immediately bear against the lugs 29 and will cause the simultaneous rotation of the intermediate collar 21 in the direction of the arrow shown in Figures 1 and 3. This will cause the inward movement of the piston 26 against the action of the spring 24 and will cause the application of the brakes. This inward movement may be slight or it may be a full depression of the brake pedal, which will cause the full application of the brakes. The circumferential slots or recesses 17 and 17a in the clutch pedal collar 14 are sufficiently long so that the lugs 30 may move freely within these recesses 17 and 17a without affecting the clutch pedal upon even a full depression of the brake pedal provided, of course, that the screw 19 be fully retracted. If now the screw 19 be fully projected and the clutch pedal arm be depressed to throw out the clutch, the stop screw 19 will immediately engage against the uppermost lug 30 and will cause the immediate rotation of the collar 21 in a counterclockwise direction which will immediately apply the brake. If the screw 19 be partially retracted and the clutch pedal be depressed, there will be no movement of collar 21 until the screw 19 engages the lug 30, the distance through which the clutch pedal 15 must move until it operatively engages with the lug 30 of collar 21 depending on the adjustment of the screw 19. If the stop screw 19 is entirely retracted, then the brakes will not be applied at all upon even a full depression of the clutch pedal. As soon as the clutch is let in, however, the spring 24 will urge the intermediate element 21 to its initial position as the brakes are relieved.

It will be seen with this construction that the brakes may be applied without in any way affecting the clutch and that if the clutch be moved to a declutching position, the brakes will be immediately applied or depending upon the adjustment of screw 19 the brakes will not be applied until the clutch pedal is moved a predetermined distance further forward. If the stop screw 19 is entirely retracted, then the brakes will not be applied at all upon the application of the clutch. I have provided, therefore, automatic means which entirely does away with the necessity of either depressing the brake pedal while unclutching or operating the emergency brake at this time.

With the structure shown in Figure 1, it is possible to connect a mechanical brake to the vertical arm 22 and secure the same action as if the arm 23 were connected to the connecting rod 25 of a master cylinder.

In Figure 6, I have shown a modification of the structure shown in Figure 1 and designed to accommodate the case of a brake controller 27 disposed in advance of the brake and clutch pedals and of the shaft 10. The only difference between the structure shown in Figure 6 and that shown in Figure 1 is that the lug 23 is omitted and the connecting rod 25 is connected to the lug 22 and extends forward. Otherwise than this, the structure shown in Figure 6 is precisely the same as that shown in Figures 1 and 2.

In Figures 7 to 11, I have shown still another embodiment of this invention but operating on exactly the same principle. The shaft is designated 10a, the brake pedal 12a and its collar 11a, the clutch pedal 15a and its collar 14a. The intermediate element 31 is loose on the shaft 10a and has an upwardly extending arm 32. This arm on its forward edge carries the laterally projecting oppositely directed lugs 33 and 34, there being a concave clearance space between these lugs, the lug 33 extending in front of the brake pedal shank 12a and the lug 34 extending in front of the clutch pedal shank 15a, these shanks, as shown in Figure 8, being angled towards each other so as to bring the inner ends of the shanks in relatively close relation. The lug 33 extends slightly rearward of lug 34 as shown particularly in Figure 9, so that the lug 34 is spaced further away from the shank 15a than lug 33 is from shank 12ª. Extending through the shank 15ª is a stop screw 35 having a lock nut 35ª.

The upper end of arm 32 has an aperture 36 and a rearwardly directed apertured lug 37 engaged with a retractile spring 38 corresponding in action to the spring 24. The connecting rod 39 is shown as bifurcated to embrace arm 32 and is connected thereto by pin 40. The connecting rod is shown as being positively connected to the piston 41 of a master cylinder 42 though a loose connection may be provided. It will be noted, however, that the instant construction permits a positive connection of the rod 39 to the piston 41 if desired. Obviously the lug 37 might be connected to a mechanically actuated brake, if necessary.

The operation of this form of my invention is the same as heretofore described. Upon the forward movement of the brake pedal, the shank 12ª will engage the lug 33 rotating the intermediate element in a direction to immediately apply the brakes, but the brake pedal may be released and returned to its initial position without affecting the intermediate element 31. As the intermediate element 31 is independent of the brake pedal, it is evident that the intermediate element may have a positive connection with the piston of a master cylinder and this piston can delay the return of the intermediate element to its initial position. If this were not the case and the intermediate element was positively connected to the brake pedal and retracted therewith, such action would cause a vacuum in the braking system.

Upon the depression of the clutch pedal, the stop screw 35 will sooner or later strike the confronting rear face of the lug 34 and upon a further depression of the clutch pedal, the brake will be applied. Here again, the clutch pedal may be released and return to its initial position while the intermediate element will be retarded, in its return to its initial position.

It is again noted that the rear face of the lug 34 is set further forward than the rear face of lug 33. This allows the clutch to be shifted to a declutching position without applying the brakes immediately and the brakes will not be applied until the pedal is forced further forward and the stop screw 35 engages the rear face of the lug 34. By adjusting the stop screw any selected time relation may be secured between the instant of depression of the clutch pedal and the instant of engagement between the clutch pedal and the intermediate element. If the stop screw be entirely retracted, the brakes will not be applied at all when the clutch pedal is depressed. Thus I can secure any desired time relation between the depression of the clutch pedal and the application of the brake.

I am aware of the fact that it has been suggested prior to my invention to operate a braking mechanism and a clutching mechanism by the movement of a single pedal or upon the movement of either the brake pedal or the clutch pedal, but in constructions known to me, the clutch and brake pedal were mounted directly on the clutch operating shaft. This was objectionable because automobile motors which are ordinarily mounted on a chassis so that the motor is floating or free to move on its mounting to have pedals attached to the clutch housing or mounted upon a shaft extending from the clutch housing would be subjected to the vibration of the motor as well as the torque of the driving mechanism. This causes the pedals to whip and rattle. While it is true that due to the flexible motor mounting the vibration of the motor is dampened, yet still a certain amount of vibration is transmitted to the pedals and thus the pedals are caused to rattle to some extent. I avoid this difficulty or objection by having the brake pedal and clutch pedal together with the intermediate element 21 or 32 mounted upon a shaft which is common to all three of these elements but does not engage directly with the clutch.

It will be seen that in all forms of my invention there are parts on the brake pedal and on the clutch pedal which confront opposed parts on the intermediate element, and that in all forms of my invention, the depression of either pedal will not affect the other pedal, and that the return of either pedal to its initial position will not affect or control in any way the return of the intermediate element to its initial position, thus permitting a retarded return of this intermediate element, and that in all forms of my invention, it is possible to positively connect the connecting rod to the piston of the master cylinder or to use a lost motion connection at this point. In all forms of my invention also, there may be a predetermined or selected lapse of time between the initial depression of the clutch pedal and the actuation of the brake by the intermediate element.

It will be seen that I have provided a brake which may be operated by depressing the clutch pedal and which is capable of relieving the service brake or the emergency brake except, for instance, when the emergency brake is set to hold the car when it is parked.

It is often the case when a car is stopped, as for example, by a traffic signal, that it will not stand still and it is necessary to apply the service brake or the emergency brake in order to hold the car from moving. It is, of course, necessary to release the set brake to get the car started again and in either case, it is not easy to accelerate the motor and at the same time release the brake especially when starting on an upgrade. My invention provides a braking mechanism which may be operated by the left foot and thus frees the right foot from the necessity of operating the usual service brake to control the motor, and a further advantage of this invention is realized when parking a car or moving a car out of a parking station where it is necessary to back and go ahead several times in order to head the car out. In such a case and with my construction, the brake and clutch both are operated by the clutch pedal, thus freeing the right foot and permitting it to be used to control the motor and making it unnecessary to shift the foot from the accelerator to the brake at the end of each run, thus making it much easier to move a car.

While I have illustrated certain embodiments of my invention which I regard as particularly effective in practice and while I have illustrated certain details of construction and arrangement of parts, I do not wish to be limited thereto as obviously many minor changes might be made without departing from the spirit of the invention as defined in the appended claims.

What is claimed is:—

1. A brake applying mechanism, including a brake pedal, a clutch pedal, an oscillatable intermediate brake operating element, the pedals and the intermediate element oscillating around the same axis, cooperating means on the intermediate element and the brake pedal constructed and arranged to shift the brake operating element to a brake applying position upon a depression of the brake pedal but permit the independent return of the brake pedal to its initial position without returning the brake operating element, and cooperating means on the brake operating element and the clutch pedal constructed and arranged to shift the brake operating element to a brake applying position upon a depression of the clutch pedal to a predetermined selected extent but permit the independent return of the clutch pedal without the return of the brake operating element to its initial position.

2. A brake applying mechanism, including a brake pedal, a clutch pedal, a shaft on which said pedals are mounted, and an intermediate brake operating element loose on the shaft, the element and the brake pedal having confronting portions which engage with each other upon a depression of the brake pedal to cause a rotation of the intermediate element in a direction to apply the brakes, the brake pedal being independently movable in the opposite direction to its initial position, the intermediate element and the clutch pedal having confronting portions engaging each other upon a depression of the clutch pedal to a predetermined selected extent, the clutch pedal being independently movable in the opposite direction.

3. A brake applying mechanism, including a shaft, a clutch pedal having a collar loose on the shaft, a brake pedal having a collar loose on said shaft, an element loosely mounted on the shaft between the brake pedal and the clutch pedal and having a brake operating connection, the intermediate element being constructed and arranged to have operative connections with the brake pedal and with the clutch pedal which permit braking movement of the brake pedal and the intermediate element without affecting the clutch pedal and which cause a brake applying movement of the intermediate element upon a movement of the clutch pedal to a declutching position.

4. A brake applying mechanism, including a shaft, a clutch pedal having a collar on the shaft, a brake pedal having a collar loose on the shaft, the collars confronting each other by being separated, said collars on their confronting faces having arcuate circumferentially extending recesses, an intermediate collar loose on the shaft and having an operative connection to a brake controlling mechanism, the intermediate collar having a lug on one face extending into the recess in the confronting face of the brake pedal collar and an opposed lug extending into the recess of the clutch pedal collar, and means urging said collar into a position with one of its lugs bearing against the rear walls of the recess in the brake pedal collar and with the other of its lugs in predetermined spaced relation to the rear wall of the recess in the clutch pedal collar, the recesses being longer circumferentially than the circumferential length of the lugs whereby the brake pedal and the clutch pedal may have independent return movement to their initial positions without causing the immediate return movement of the intermediate member.

5. A brake applying mechanism, including a shaft, a clutch pedal having a collar surrounding the shaft, a brake pedal having a collar surrounding the shaft, the brake pedal and clutch pedal being independently movable, each collar being recessed, the collars being recessed upon their confronting faces, each recess extending circumferentially of the collar, one wall of the recess in the clutch collar having a stop screw extending therethrough and adjustable to project a greater or less extent into the recess and an intermediate collar loosely surrounding said shaft, a connection from said collar to a brake controlling means, and a spring operatively connected to the collar to urge it to a brake retracting position, the intermediate collar having laterally projecting lugs extending from its opposite faces into the recesses of the brake collar and the clutch collar respectively, said recesses having a circumferential length greater than the circumferential length of said lugs, said spring normally urging the intermediate collar to a position with its lugs approximating the like walls of the recesses in the two collars whereby upon a depression of the clutch pedal to predetermined selected degree the intermediate collar will be rotated to apply the brakes against the action of said spring and upon a depression of the brake pedal the intermediate collar will be rotated in a direction to apply the brakes without affecting the clutch collar, the elongated recesses permitting the return of the brake pedal or clutch pedal to its initial position without causing the return of the intermediate collar to its initial position.

6. A brake applying mechanism, including a shaft, a brake pedal and a clutch pedal mounted on the shaft for independent movement and each having a shank, an intermediate element mounted on the shaft and operatively connected to a brake operating mechanism, the intermediate element having laterally projecting lugs disposed in advance of and confronting the shanks of the brake and clutch elements whereby upon a depression of either of said pedals the brake will be applied and whereby either of said pedals may return to its initial position without causing the return of the intermediate element to its initial position.

7. A brake applying mechanism, including a shaft, a brake pedal and a clutch pedal mounted on the shaft for independent movement and each having a shank, an intermediate element mounted on the shaft and operatively connected to a brake operating mechanism, the intermediate element having laterally projecting lugs disposed in advance of and confronting the shanks of the brake and clutch elements whereby upon a depression of either of said pedals the brake will be applied and whereby either of said pedals may return to its initial position without causing the return of the intermediate element to its initial position, the rear face of the lug confronting the clutch pedal shank being spaced a substantial distance from the confronting face of the clutch pedal shank whereby to permit a predetermined initial movement of the clutch pedal before the application of the brakes.

8. A brake applying mechanism, including a shaft, a brake pedal and a clutch pedal mounted on the shaft for independent movement and each having a shank, an intermediate element mounted on the shaft and operatively connected to a brake operating mechanism, the intermediate element having laterally projecting lugs disposed in advance of and confronting the shanks of the brake and clutch elements whereby upon a depression of either of said pedals the brake will be applied and whereby either of said pedals may return to its initial position without causing the return of the intermediate element to its initial position, the rear face of the lug confronting the clutch pedal shank being spaced from the confronting face of the shank a distance greater than the distance between the rear face of the opposite lug and the confronting face of the brake pedal shank, and a stop screw adjustable through the clutch pedal shank and adapted to engage the corresponding lug on the intermediate element, the adjustment of the screw controlling the instant of engagement between the clutch pedal shank and said intermediate element.

9. Brake applying mechanism, including a brake pedal, a clutch pedal and an intermediate brake operating element, the pedals and the intermediate element being mounted for independent rotative oscillation in parallel planes around a common axis, the intermediate element being constructed and arranged to have operative engagement with the brake pedal and with the clutch pedal which permits braking movement of the brake pedal and the intermediate element without affecting the clutch pedal and which causes a brake applying movement of the intermediate element upon a movement of the clutch pedal to a de-clutching position without affecting the brake pedal.

10. Brake applying mechanism, including a brake pedal, a clutch pedal and an intermediate brake operating element, the pedals and the intermediate element being mounted for independent rotative oscillation in parallel planes around a common axis, the intermediate element being constructed and arranged to have operative engagement with the brake pedal and with the clutch pedal which permits braking movement of the brake pedal and the intermediate element without affecting the clutch pedal and which causes a brake applying movement of the intermediate element upon a movement of the clutch pedal to a de-clutching position without affecting the brake pedal, the clutch pedal having a clutch operating rod operatively engaging therewith for free swinging movement relative thereto.

RAYMOND ROURKE.